July 30, 1940.   W. A. HARRIS ET AL   2,209,565
VALVE CONTROL
Filed Feb. 21, 1936   3 Sheets-Sheet 1
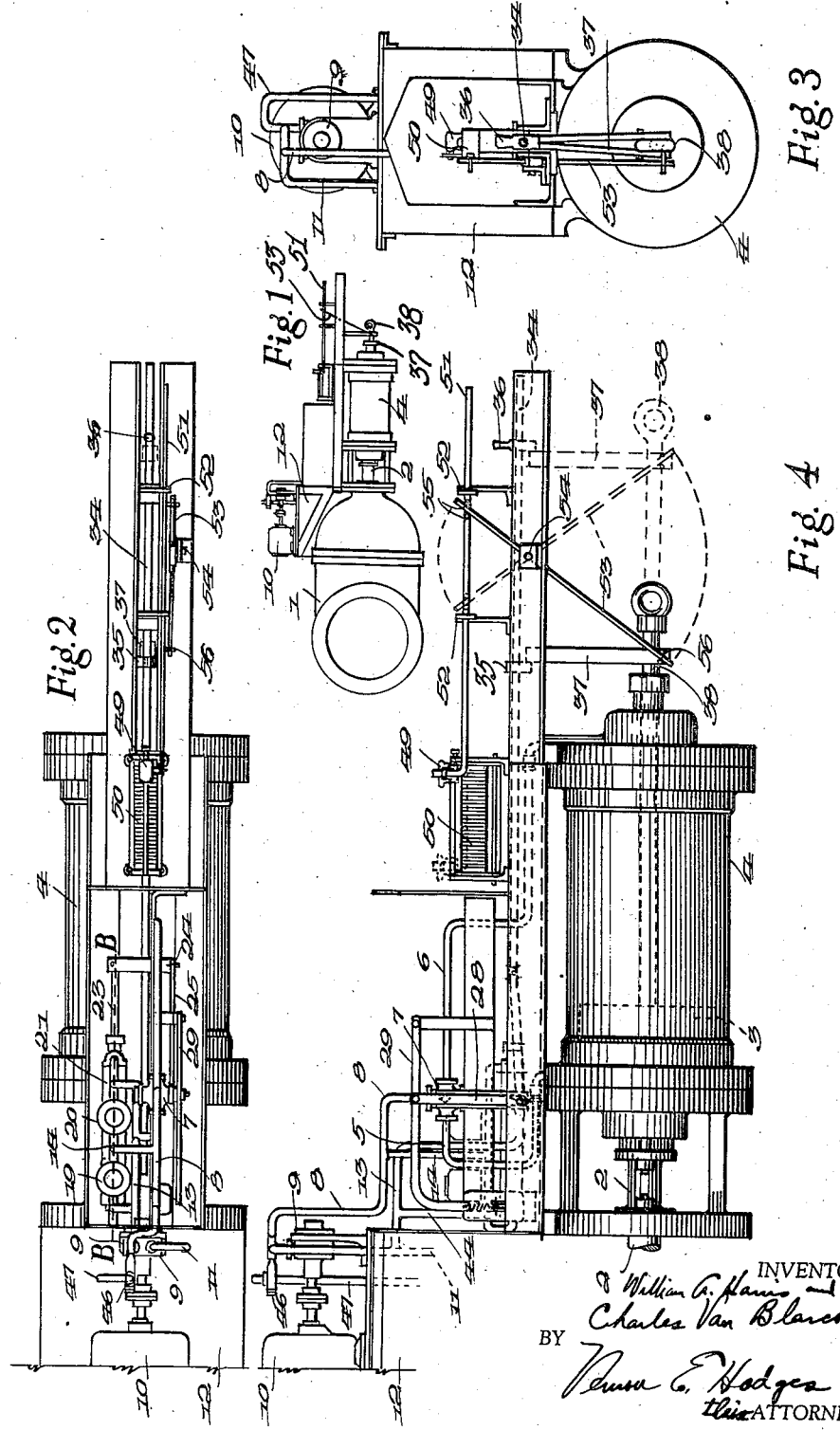
INVENTORS
William A. Harris
Charles Van Blarcom
BY
Vernon E. Hodges
their ATTORNEY.

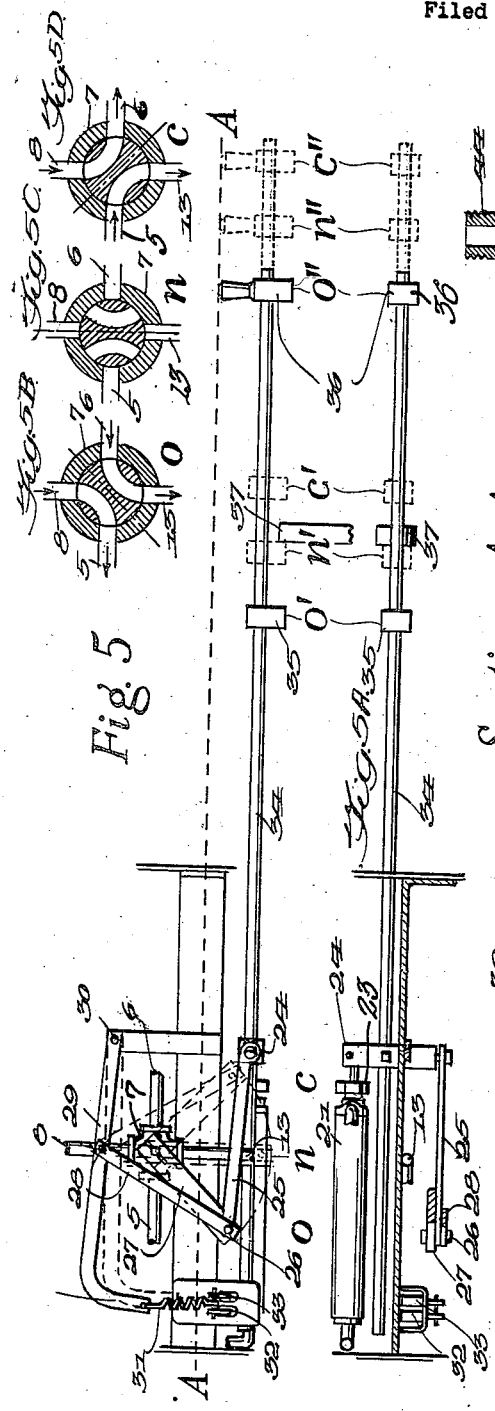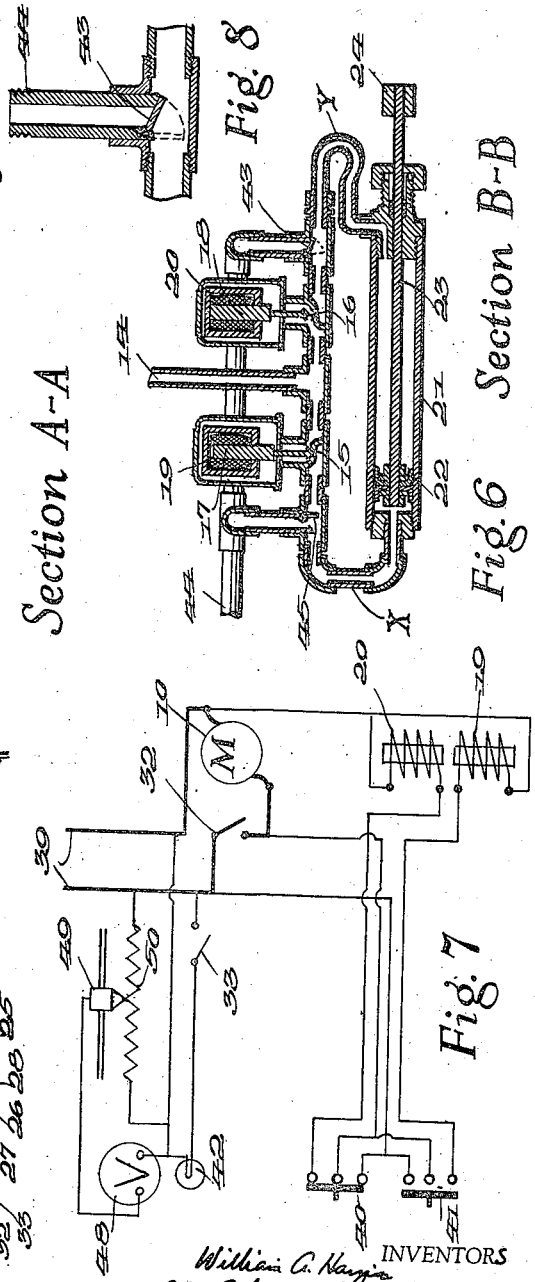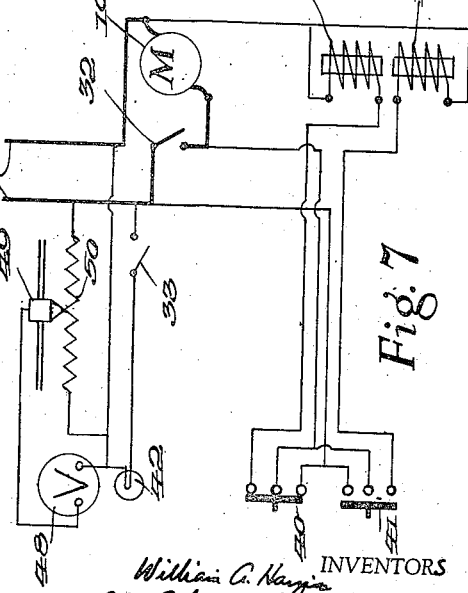

Patented July 30, 1940

2,209,565

UNITED STATES PATENT OFFICE 2,209,565

VALVE CONTROL

William A. Harris, Hillside, and Charles W. Van Blarcom, Boonton, N. J., assignors to Hydooraulic, Inc., Orange, N. J., a corporation of New Jersey Application February 21, 1936, Serial No. 65,130

1 Claim. (Cl. 60—52)

This invention relates to an improvement in valve controls, and more particularly for controlling large gate valves and other closures requiring like operators.

In operating large gate valves of the type used, for instance in a filtration plant, considerable power is required in order to move the valves, and usually they must be operated from a remote point, and provision should be made to indicate the extent of operation, so that it may be determined at any time in what position the valve is set and to what extent it is open or closed.

This invention has as its objects the control of closures, such as large gate valves, by power obtained, for instance, from a hydraulic power device, and the provision of automatic means for controlling the hydraulic power devices and for regulating the flow of fluid to and from the same. This invention provides for such automatic control and is simple to initiate, and when operated, it will move the closure to an open or closed position automatically and then stop the movement in either of said positions according to the direction in which the movement is initiated. It is very effective in the control of large closures where considerable power is required for moving the same.

A preferred embodiment of the invention is illustrated in the accompanying drawings, in which:

Fig. 1 is a side elevation of the control mechanism applied to a gate valve;

Fig. 2 is a top plan view of the control mechanism, enlarged;

Fig. 3 is an end elevation thereof, looking toward the left.

Fig. 4 is a side elevation thereof;

Fig. 5 is a side elevation of a portion of the four-way control valve mechanism in one operating position;

Fig. 5A is a horizontal section on the line A—A of Fig. 5;

Figs. 5B, 5C and 5D are sectional views through the four-way control valve in different positions;

Fig. 6 is an enlarged longitudinal vertical sectional view through the pilot cylinder and solenoid valves, taken on the line B—B of Fig. 2;

Fig. 7 is a diagrammatic view of the wiring layout;

Fig. 8 is an enlarged sectional view of one of the pilot flap-valves, and

Figure 9:
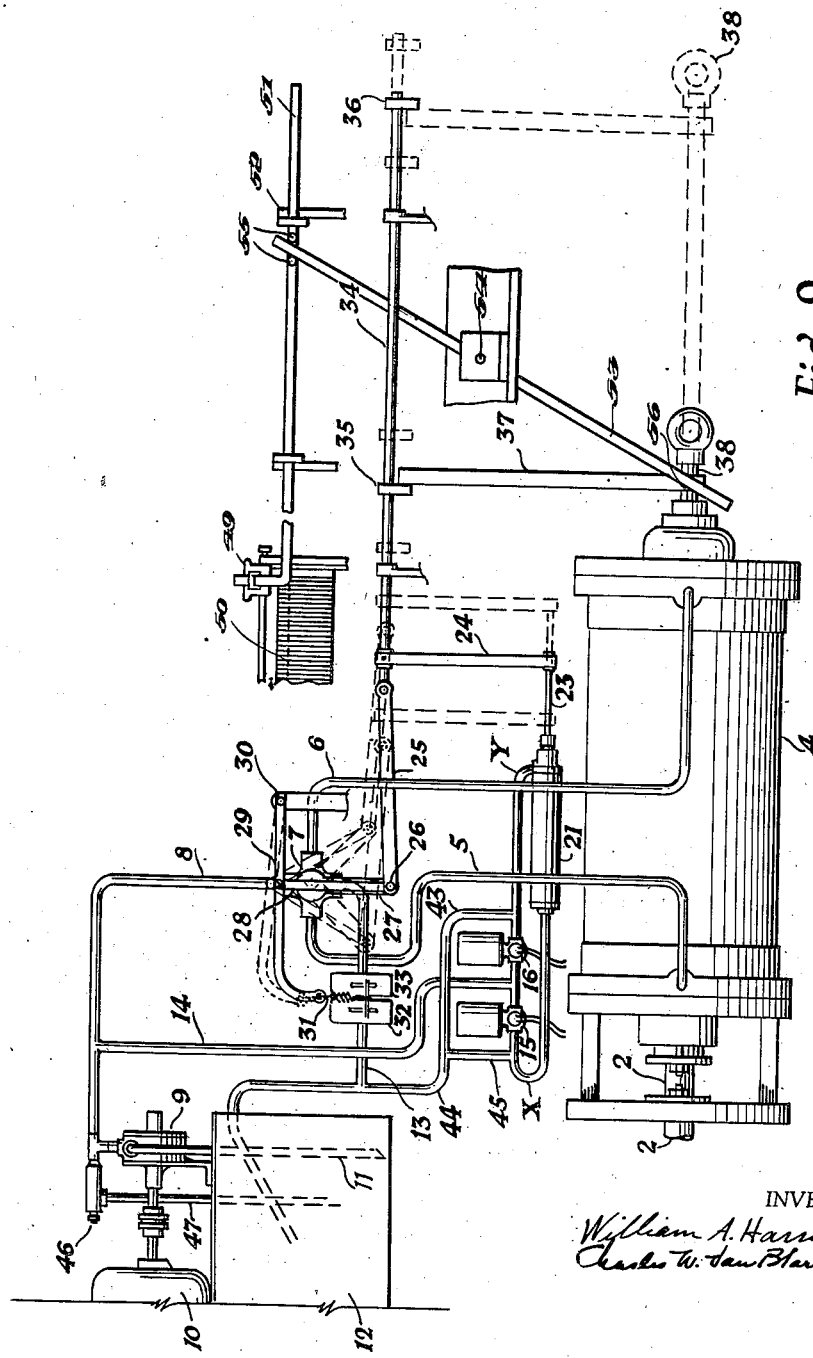
Fig. 9 is a schematic lay-out illustrating pump, cylinders, valves and pipe connections.

The invention is shown and described for operating a large gate valve. Referring to Fig. 1, the gate valve is designated generally by the numeral 1, and has a valve stem 2 extending therefrom for slidably moving the valve discs from one extreme position to another, the opposite end of the valve stem 2 being attached to a piston 3 in a power cylinder 4. The piston is reciprocated in the cylinder 4 by liquid fluid admitted into one end of the cylinder or the other, according to the direction of movement desired for the gate valve.

Fluid is supplied to the opposite ends of the cylinder 4 by pipes 5 and 6, (Fig. 4) which extend from opposite sides of a four-way valve 7, shown in Figs. 5B, 5C and 5D. The liquid fluid is supplied from the valve 7 through the pipes 5 and 6, alternately, to the ends of the cylinder 4. Liquid fluid is supplied to the valve 7 through a pipe 8 from one side of a gear or other type of pressure pump 9, operated by an electric motor 10. The pump 9 receives liquid fluid through a pipe 11 from a reservoir 12. The other side of the four-way valve 7 has a fluid return pipe 13, extending therefrom to the reservoir 12, for the return of fluid from either end of the cylinder 4 to the reservoir, as indicated by the arrows in Figs. 5B and 5D.

The fluid supply pipe 8 has a by-pass 14 connected therewith and extending to valves 15 and 16, shown in Fig. 6, which valves are normally closed by gravity, but are carried on armatures 17 and 18, respectively, of electro-magnets 19 and 20, so that when either of the electro-magnets is energized, the corresponding valve will be raised from its seat and held open for the flow of liquid fluid in one direction from the by-pass pipe 14 to its end of pilot cylinder 21.

Pipes X and Y extend from opposite ends of cylinder 21 and passage of fluid therethrough is directed and controlled by valves 15 and 16, respectively. A piston 22 is operatively mounted in the cylinder 21 and is moved by the liquid fluid, the piston having a piston rod 23 thereon, extending through one end of the cylinder and carrying at its outer end a cross bar 24, shown in Figs. 5, 5A and 6.

The opposite end of the cross bar 24 has one end of a link 25 attached thereto, the opposite end of which link 25 has a pivot 26 connecting it with the free end of valve arm 27, which operates the valve 7 to the positions shown in Figs. 5B, 5C and 5D, according to the positions of the pilot piston 22, in its cylinder 21, these positions representing the positions of the four-way valve 7 for the opening, neutral and closing actions of the gate valve 1.

The pivot 26 also has one end of a link 28 connected therewith, the opposite end of which link is connected with an arm 29, pivotally mounted at one end, as at 30, and having its opposite end connected by a spring 31 to a pair of spring snap switches 32 and 33, as shown in Figs. 5 and 5A, the purpose of which will be described hereinafter.

A slidably mounted stop rod 34 has one end fixed to the cross bar 24 and its opposite end carries spaced stops 35 and 36, between which stops is arranged an arm 37 carried by a rod 38, attached to the power piston 3 and extending through the outer end of the cylinder 4.

Fig. 7 represents the wiring diagram, in which the main line from the source of electrical supply is designated generally by the numeral 39, one lead of which extends to one side of the motor 10 and solenoids 19 and 20, the opposite lead of which extends to switches 40 and 41, by which the current therethrough is controlled.

Operation

Normally the four-way valve and its associated operating parts are in neutral positions when the gate valve is fully open or fully closed, as indicated at $n$ in Fig. 5C or at rest in any position between full open and closed, and the gate valve is locked in that position by the four-way valve.

The manually controlled switch 40 is shown closed in Fig. 7, which closes the circuit through the solenoid 20, opening the valve 16, as represented in Fig. 6, and also energizes the motor 10 to operate the gear pump 9 which forces liquid fluid, such as oil of suitable character, from the reservoir 12, through the supply pipe 8 and by-pass 14. Normally the parts will be in neutral positions, the valve 7 being closed as represented in Fig. 5C, and the valve arm 27 being vertical, as represented by dotted lines, and the letter $n$ in Fig. 5, but the opening of the electro-magnet controlled valve 16 causes fluid to be forced therethrough from the by-pass pipe 14 into the right hand end of the pilot cylinder 21, in Fig. 6, moving the piston 22 from a neutral position to the left hand end of the cylinder as shown in Fig. 6. This movement of the piston 22 and piston rod 23 draws the attached cross bar 24 back and the latter acts through the connecting link 25 to turn the valve arm 27 from the neutral position $n$ to the left hand position $o$, as shown in full lines in Fig. 5, thereby opening the valve 7 to the position shown in Fig. 5B thereby connecting pipes 5 and 8 and 6 and 13, respectively, whereby fluid will be forced into the left hand end of the power cylinder 4 to cause movement of the power piston 3 shown in dotted lines in Fig. 4, to the right for opening the gate valve, shown in Fig. 1.

This movement of the pivot 26 causes the link 28 to raise the arm 29, see Fig. 5, thereby closing the switches 32 and 33, the former of which closes the circuit to the motor and the switch 33 closes a circuit to an electric light 42, shown in Fig. 7. The operator may release the push button switch 40 when the light 42 appears.

This same movement of the cross bar 24 to the left also moves the stop rod 34 to which it is attached with the stops 35 and 36 from the positions $n'$ and $n''$, respectively, to the positions $o'$ and $o''$, in Figs. 5 and 5A, so that upon the opening of the four-way valve 7 to the right, the movement of the piston 3 shown in Fig. 4 to the right, the rod 38 and arm 37 move from the full line positions to the dotted line positions in the opening of the gate valve. The arm 37 engages the stop 36 in the position $o''$ in Figs. 5 and 5A, and moves it to the position $n''$, which movement of the stop 36 causes movement of the rod 34 to the right and with it, link 25 and valve arm 27, to return the four-way valve 7 to the neutral position $n$ (Fig. 5C), locking the oil system, and through the link 28 and arm 29 permitting the spring snap switches 32 and 33 to open, deenergizing the motor 10, inasmuch as the gate valve has been moved to a fully open position. By making contact on the push-button 41 and holding that contact, the electro-magnet 19 will be energized, the valve 15 will be opened, and thus the piston 22 and the piston rod 23 will be moved to the point at which the four-way valve 7 is in the neutral position as shown in Fig. 5C, at which time the signal-lamp will go out, whereupon the push-button is to be released, and the piston 3 will remain in its then established position.

As valve lever 27 is being moved to position $n$, by the movement of rod 34, this causes movement also of the pilot piston 22, which is likewise attached to the cross bar 24, to a central position, forcing the fluid from the cylinder 21, through flap-valve 43, which drops open of its own weight when the liquid flow in pipe Y is stopped, after solenoid 20 is deenergized and valve 16 closes by gravity and the liquid is returned through the pipes 44 and 13 to the reservoir 12. The flap-valve 43 is especially adapted so that it will leak, and while it is engaged in the position in which it is shown in Fig. 8, it will merely direct the flow of fluid past the pipe 44 so that it will flow through the pipe Y to apply its pressure against the piston 22.

When the push button switch 41 is depressed, the operation is reversed, and four-way valve 7 is moved to position $c$ in Fig. 5D, actuating the primary piston 3 in the opposite direction or to the left as shown in Fig. 4, to close the gate valve. When switch 41 is depressed, the solenoid 19 would be energized to open the valve 15 and cause the pilot piston 22 to be moved to the right, and when solenoid 19 is deenergized, due to valves 15 and 45 dropping by gravity, the liquid would be returned from the pilot cylinder 21 through flap-valve 45 and pipes 44 and 13 to the reservoir 12.

A spring-pressed pressure relief valve 46 is connected with one side of the fluid pipe 8, as shown in Figs. 2 and 4, on the power side of the pump 9, so as to return fluid through by-pass 47, back to the reservoir 12, in the event of an obstruction which prevents the closing or opening of the gate valve, so that no damage will be done to the system or, more important, to the gate valve.

Sustained pressure on the opposite push button switch 40 or 41 at any point of the travel of the gate valve will stop the movement, inasmuch as the push-button energizes the other solenoid to move the pilot piston 22 in the opposite direction, returning the four-way valve 7 to the neutral position, at which time the signal lamp goes out and the contact of the push-button is to be released. Pressure on the wrong push button switch when gate valve is open or closed can do no damage to the system, inasmuch as no action of the gate valve would occur by reason thereof. The motor would be energized and fluid would pass through relief valve 46 and by-pass 47 back to reservoir 12.

The push button switch should be held in any case long enough for the solenoid to be energized to cause movement of the pilot piston, cross bar, and four-way valve to the desired operating position, which will be indicated by the illumination of the lamp 42 when the parts have been moved to one extreme position or the other.

In order to indicate at a remote control station located a considerable distance from the gate valve just what action is occurring at the valve, it is desirable that an indicator be provided adjacent the push button switches 40 and 41 which will also be located at the control station. To cause such an indication, we have provided an indicating instrument, such as a volt-meter 48, one side of which is connected directly with the main line 39, and the opposite side of which is connected through a movable contact 49 of a rheostat 50, which movable contact varies the resistance in the volt-meter circuit according to the movement of the contact 49.

The rheostat 50 is mounted adjacent the power cylinder 4, as shown in Figs. 2 and 4, and is adapted to be actuated by a rod 51, slidable in guides 52 on the frame structure. A lever 53 is pivoted as at 54 on the frame work and has one end thereof received in a pivoted sleeve or between spaced pins 55 on the rod 51, and the opposite end thereof is received between spaced pins 56, on the arm 37, so as to move the rod 51 and the movable contact 49, in accordance with and in the same ratio as the movement of the rod 38 attached to the power piston 3, although in the opposite direction. The dial of the volt-meter 48 may be calibrated in inches, so as to indicate the extreme positions of movement of the gate valve, either open or closed according to the variation of the rheostat 50. In other words when the gate valve is closed, as shown in full lines in Figs. 1 and 4, the volt-meter will read "O", or when the gate valve is fully open, as indicated in dotted lines in Fig. 4, the reading would indicate the size of the gate valve opening, such as 20 inches for instance, and during such opening movement the volt-meter would read, for instance, one inch, two inches, etc., and reverse this reading on the closing movement. Of course other forms of remote controls and indicators may be used instead of the volt-meter, but the latter has been found satisfactory and gives accurate results even where there is some current fluctuation.

While the invention has been described and illustrated in connection with a gate valve, it will be obvious that the power mechanism may be used for operating or controlling other types of closures, such as, doors, gates, valves, dampers, ventilators, machine controls, presses, etc.

We claim:

In a control system of the character described, the combination of a hydraulic double-acting power device, a motor driven pump for supplying pressure liquid to said power device, a four-way valve for regulating the direction of flow of said liquid to said power device and having a neutral position in which it prevents flow to and from said device, a follow-up connection between said power device and said four-way valve for returning said valve to neutral position as the power device reaches either end of its stroke, independent hydraulically actuated means for operating said four-way valve, electrically operated pilot valves controlling the direction of flow of liquid to the four-way valve operating means, a pair of switches, each switch concurrently controlling the electric circuit for one of said pilot valves and for said pump motor, electric signal means and a holding circuit for said pump motor energized by said four-way valve when said valve leaves neutral position, and calibrated electric means continually indicating the position of said power device.

WILLIAM A. HARRIS.
CHARLES W. VAN BLARCOM.